July 7, 1970 C. MÜNCHBACH 3,518,910
FLYING SHEARS FOR CUTTING SHEET MATERIAL
Filed Dec. 20, 1967
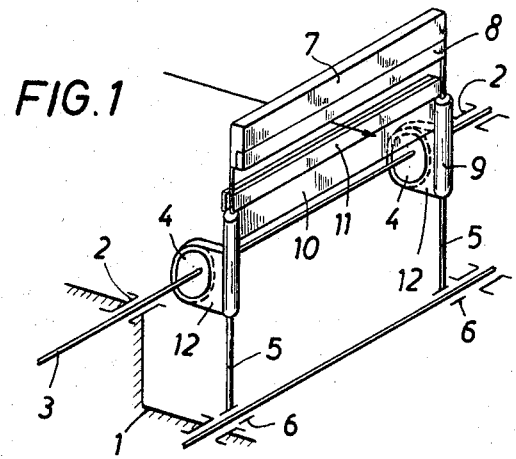
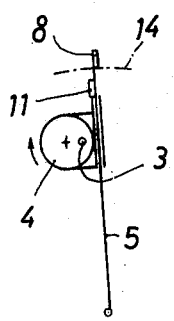 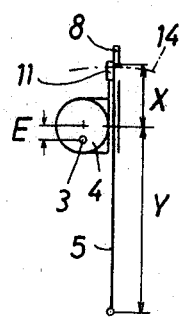 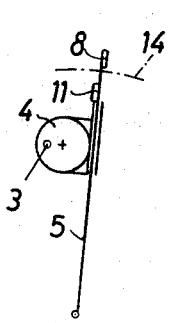 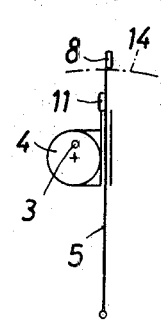
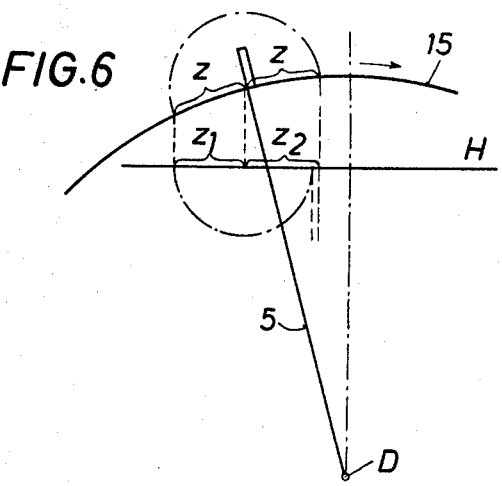
Inventor
Curt Münchbach
By: Edwin E. Greigg
— ATTORNEY —

United States Patent Office 3,518,910
Patented July 7, 1970

3,518,910
FLYING SHEARS FOR CUTTING SHEET MATERIAL
Curt Münchbach, Sonnenberg, Pforzheim, Germany, assignor to Irma Ungerer, Pforzheim, Germany
Filed Dec. 20, 1967, Ser. No. 692,163
Claims priority, application Germany, Dec. 24, 1966,
U 13,394
Int. Cl. B23d 25/06; B26d 1/56
U.S. Cl. 83—316                                6 Claims

ABSTRACT OF THE DISCLOSURE

Flying shears for cutting continuously advanced sheet material including a first cutting blade fixedly mounted on a pair of members oscillating in and against the direction of sheet feed, a second cutting blade affixed to a support slidably mounted on said members and moved thereon towards and away from the first blade by eccentrics which at the same time cause oscillation of said members in and against the direction of sheet feed.

BACKGROUND OF THE INVENTION

In the present day high quality sheets of definite dimensions are cut almost exclusively from cold rolled stock manufactured in rolling mills and stored in coils weighing as much as thirty tons. It was the practice for a long time to unwind, straighten and cut the sheet stock in special cutting machines in the rolling plants themselves. The sheets were advanced with high speed through flying shears which then cut the sheet into desired lengths, whereupon they were stacked and ready to be transported for use in the sheet working industry.

More recently, the sheet working industry, for the purpose of a more economical management of their stock has itself been storing the large coils and cutting sheets therefrom according to requirements. The sheet working industry uses mostly slow-operating cutting machines with a sheet velocity up to approximately 100 ft. per minute. The shears of these cutting machines are oscillatingly or linearly reciprocating and, when the cutting operation itself takes place, move in the same direction and with the same speed as the advancing sheet. These shears, unlike the fast moving shears of the cutting machines used in the rolling mills, do not move continuously but are displaced from their position of rest by a periodic electric signal and are moved along a predetermined path. After cutting, the shears return into their initial position. The sheet is advanced at the same speed regardless of the position and movement of the shears.

For decades, flying shears have been known wherein the forward and return motions of a blade supporting carriage are effectuated on prismatic tracks by means of two "forward" cam plates acting on two feed rollers, and two "return" cam discs associated with two further feed rollers. To effectuate the cutting motion of the shears there have been provided two additional cam plates with rollers and levers to close the shears (cutting operation) and two further cam plates with rollers and levers to open the shears.

OBJECT, SUMMARY AND ADVANTAGES OF THE INVENTION

It is an object of the invention to provide improved flying shears of the oscillating type, the structure of which is substantially simpler and its manufacture more economical than devices known heretofore.

Briefly stated, according to the invention one of the blade supports is slidably held on at least one oscillating member which is, in turn, swingably held at its lower end in a stationary bearing and carries at its upper end another blade support rigidly secured thereto. According to a further feature of the invention, the slidable blade support is integral with an eccentric rotatable by a driving shaft held in a stationary bearing. By virtue of said eccentric there is imparted, on the one hand, a reciprocating sliding motion to one of the blade supports along the oscillating member and, on the other hand, a to-and-fro swinging motion to said oscillating member.

Due to the substantially reduced number of sliding and rolling members and due to the substantial decrease in weight of the moving parts, the apparatus constructed in accordance with the invention operates with smaller frictional losses and lesser wear of the contacting machine parts. On the one hand, this results in an increased life expectancy of the apparatus and, on the other hand, makes possible an increase in the velocity of the sheet advance.

The invention will be better understood and further objects as well as advantages will become more apparent from the ensuing detailed specification of exemplary embodiments taken in conjunction with the drawing.

BRIEF DESCRIPTION OF THE DRAWINGS

FIG. 1 is a schematic isometrical view of one embodiment of the invention;

FIG. 2 is a schematic elevational view of the same embodiment shown in its position of rest;

FIG. 3 is a schematic elevational view of the same embodiment in a position immediately after completion of the cutting operation;

FIG. 4 is a schematic elevational view of the same embodiment showing the oscillating members in an extreme position;

FIG. 5 is a schematic elevational view of the same embodiment showing the blades in their lowest position; and FIG. 6 is a schematic elevational view of one part of a modified embodiment.

DESCRIPTION OF THE EMBODIMENTS

Turning now to schematic FIG. 1, there is shown a machine stand 1 including bearing means 2 in which journals a driving axle 3. To axle 3 there are fixedly secured in a spaced relation and in phase two large eccentrics 4. Two elongated oscillating members 5 of circuar cross-section are at their lower end swingably held in bearings 6 affixed to the machine stand 1. The upper end of the oscillating members 5 are rigidly secured together by means of an upper support 7 to which there is affixed an upper blade 8. The lower support 10 which, at its upper edge, carries a lower blade 11 is slidably affixed to oscillating members 5 by means of guides 9. Each eccentric 4 journals in a bearing 12 integral with guide 9 and disposed under and laterally of the lower support 10.

The precedingly-described apparatus operates in the following manner.

As the sheet material to be cut is forwarded between the open blades 11, 8 with constant speed in the direction indicated by the arrow in FIG. 1 and along the path indicated at 14 in FIGS. 2–5, the eccentrics 4 are in their position of rest as shown in FIG. 2. Upon an electric signal generated at predetermined intervals corresponding to the desired lengths of the sheet, the driving shaft 3 executes, by means of a conventional mover and clutch mechanism (neither shown), one revolution in a clockwise direction. During this revolution the two eccentrics 4 cause the two oscillating members 5 with the upper and lower supports 7 and 10, respectively, to move as a unit from their position of rest in the direction of sheet advance to their extreme position shown in FIG. 4 and then back into their position of rest shown in FIG. 2. Also, during the revolution of driving shaft 3, the two eccentrics 4 cause the lower support 10 to move upwardly and then downwardly. As a result, the lower and upper blades 11 and 8 are brought into and then out from their cutting position. The lower support 10 with the blade 11 reaches its upper extreme position when the eccentrics 4 are in their position depicted in FIG. 3. In this position the cutting edges of upper and lower blades 8 and 11 are overlapping to the extent of a few millimeters. Thus, the cutting operation itself takes place shortly before the uppermost position of the lower support 10. As the rotation of shaft 3 continues, the lower support 10 moves downwardly and reaches its lower extreme position when the eccentrics are oriented as shown in FIG. 5. Thereafter, the lower support 10 again rises until it reaches its position of rest as shown in FIG. 2.

The speed of the oscillating motions of members 5 in and opposed to the direction of the sheet advance and the speed of the lower support 10 along the members 5 vary according to two out-of-phase sine curves. During the cutting operation proper, the completion of which is shown in FIG. 3, the velocity of the oscillating members 5 in the direction of the sheet advance is at its maximum value and decreases thereafter in the same direction until the members 5 reach their position shown in FIG. 4 where their velocity becomes zero. During the cutting operation proper, that is, when the velocity of the blades in the direction of sheet advance is on and about the maximum portion of their speed curve, their speed is relatively uniform. This speed may be varied with respect to the speed of the sheet advance by adjusting the eccentricity E and the point of engagement between the eccentrics and the oscillating members 5, changing thereby the length components X and Y of the members 5 (FIG. 3). Due to the fact that the bearing 12, together with the upper support 10, is displaced along members 5 during the revolution of the eccentric, a correction of the velocity of the blades in the direction of sheet advance is achieved resulting in motions of equal speed of the blades and the sheet during the cutting operation.

This correction in speed is achieved automatically due to the fact that during the cutting operation (FIG. 3) the bearings 12 are displaced upwardly on the oscillating members 5 so that the X component decreases while the Y component increases. The result is a decrease in the velocity component of the oscillating motion in the direction of sheet advance counteracting the increase in velocity caused by the rotation of the eccentrics in this phase of their motion. With appropriate choice of lengths X, Y and E, the sine-shaped velocity curve of the blades in the direction of sheet advance may be compensated during the cutting operation to such an extent that the velocity of the blades during the entire cutting operation corresponds exactly to the speed of the advanced sheet.

As the lower blade 11 descends from its upper extreme position shown in FIG. 3, the X component of the oscillating member 5 increases while the Y component thereof decreases. Now an opposite effect is achieved compared to that during the upward motion of the lower blade. The velocity component of the blades in the direction of sheet feed is increased with respect to the velocity determined by the sine function of the horizontal oscillating motion. As a result, the cutting edges of the blades move particularly rapidly away from the cut edges of the sheet in the horizontal direction immediately after the cutting operation.

Turning now to the embodiment shown in FIG. 6, the effect of the horizontal movement of the blades away from the cut edges of the sheet immediately after the cutting operation is magnified by arranging the cutting device in such a manner that the oscillating members 5, in the position of the blades at the moment of completing the cutting operation, do not, as shown in FIG. 3, assume a vertical position but are inclined against the direction of sheet feed. The angle between the members 5 during the completed cutting position (that is, when the lower blade 11 is in its upper extreme position) and a perpendicular line is approximately 8° (this angle is shown larger in FIG. 6 for clarity.) During half a revolution of the eccentric from the position shown in FIG. 2 into the position shown in FIG. 4, a point on the cutting edge of the upper blade describes a circular path 15, the center of which lies in axis D of the bearings associated with the oscillating members 5. The eccentrics thus cause a symmetric displacement of equal length of the upper blade along the arc 15 prior and subsequent to the completed cutting position of members 5 assumed in FIG. 6. As a result, the upper blade travels along arc 15, shortly before and shortly after the position in FIG. 6, equal distances z in equal time and equal speed. The horizontal projections z1, z2 of paths z shown on horizontal line H are, however, of different magnitudes before and after the shown position of the members 5. The horizontal path component z2 and thus its corresponding horizontal speed component of the blades 8 and 11 after the cutting operation are larger than the horizontal path component z1 and thus the corresponding speed component during the cutting operation. By arrangement the members 5 in an inclined manner, as described hereinabove in connection with FIG. 6, there is thus achieved an increase in the velocity of the blades after the cutting operation.

It is within the scope of the invention to reverse the operation of the blades. Accordingly, the lower support may be rigidly secured to the oscillating members, while the upper support is slidably guided thereon and carries the bearings for the eccentrics. In such an arrangement the driving shaft for the upper support and oscillating members would be advantageously disposed above the lower blade and the advancing sheet.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

That which is claimed is:

1. In flying shears of the type adapted to cut predetermined lengths from a continuously advanced sheet material by two cutting blades oppositely disposed with respect to said sheet material, the improvement comprising, at least one elongated oscillating member pivotally held at one end, one of said cutting blades being fixedly secured to the other end of said oscillating member by means of a first blade support, the other of said cutting blades being slidably mounted on said oscillating member by means of a second blade support and movable along said member into and away from a cutting position with respect to said one blade and sole means for imparting both an oscillating motion to said member and a sliding motion to said other cutting blade.

2. Flying shears as defined in claim 1, wherein said sole means includes at least one eccentric operatively connected to said second blade support and means for rotating said eccentric to impart both a sliding motion to said second blade support and an oscillating motion to said oscillating member.

3. Flying shears as defined in claim 1, wherein said oscillating members are two in number, are disposed in spaced relation and are rigidly interconnected by said first blade support.

4. Flying shears as defined in claim 2, wherein said oscillating members are two in number, are disposed in spaced relation and are rigidly interconnected by said first blade support, to each of said oscillating members there is operatively connected an eccentric affixed in phase to a common driving axle.

5. Flying shears as defined in claim 2 including a first bearing member slidably mounted on said oscillating member, a second bearing member in which said eccentric is rotatably held, said first and said second bearing members are formed as a unit which is rigidly affixed to said second blade support.

6. Flying shears as defined in claim 2, wherein said oscillating member forms an angle of less than 90° with the direction of sheet feed when said second blade support is in its extreme position adjacent said first blade support on said oscillating member.

References Cited

UNITED STATES PATENTS

| | | | |
|---|---|---|---|
| 1,531,403 | 3/1925 | Koerner | 83—316 |
| 2,261,007 | 10/1941 | Talbot | 83—316 X |
| 2,800,179 | 7/1957 | Munchbach | 83—316 |
| 3,202,029 | 8/1965 | Morath | 83—317 X |
| 3,279,291 | 10/1966 | Brombach et al. | 83—316 X |
| 3,277,759 | 10/1966 | Brombach et al. | 83—316 X |

WILLIAM S. LAWSON, Primary Examiner